United States Patent [19]
Kanzler et al.

[11] 3,898,841
[45] Aug. 12, 1975

[54] EXTERNAL COMBUSTION HOT GAS PISTON ENGINE

[75] Inventors: Hans-Joachim Kanzler, Viernheim; Günter Reuchlein, Gersthofen, both of Germany

[73] Assignees: Maschinenfabrik Augsburg-Nurnburg Aktiengesellschaft, Augsburg; Motoren-Werke Mannheim AG vorm. Benz Abt. stat. Motorenbau, Mannheim, both of Germany

[22] Filed: Apr. 15, 1974

[21] Appl. No.: 460,754

[30] Foreign Application Priority Data
Apr. 30, 1973 Germany.............................. 2321872

[52] U.S. Cl. ..................... 60/525; 431/164; 60/526
[51] Int. Cl. ............................................. F02g 1/06
[58] Field of Search ............ 60/517, 524, 525, 526, 60/39.51 H, 39.51 R; 431/164 X, 165, 166, 167

[56] References Cited
UNITED STATES PATENTS
3,717,993  2/1973  Potter................................... 60/517

Primary Examiner—Martin P. Schwadron
Assistant Examiner—Allen M. Ostrager
Attorney, Agent, or Firm—William R. Woodward

[57] ABSTRACT

Two or more burners heat separate heater sections, with the hot combustion products passing through rows of heater tubes and then giving up more of their heat to a preheater for the air of a different burner. If three or more burners are used, the burners and preheaters are advantageously arranged in a closed chain. Mutual interaction is thus provided so that variations in the combustion intensity in one burner are rapidly equalized over the whole engine; regulation and control is improved and the gas flow paths are to a large extent short and deflection-free. Distribution of mechanical and thermal loads throughout the engine are equalized, making it possible to operate normally at higher temperatures.

11 Claims, 5 Drawing Figures

EXTERNAL COMBUSTION HOT GAS PISTON ENGINE

This invention relates to a hot gas piston engine of the external combustion type and more particularly to the arrangement of combustion chambers and air preheaters in such an engine for improved stability of operation.

The type of engine to which the invention particularly relates is a double acting engine with one or more hot working chambers and one or more cold working chambers, in which each hot working chamber is connected through a heater, a regenerator and a cooler, in sequence, to a cold working chamber. In the heater, the working gas passes through an array of tubes connected in parallel that is exposed to or in a combustion chamber from which the hot products of combustion pass between the tubes. The air supply for the combustion chamber is preheated in a heat exchanger, using the heat remaining in the products of combustion after they have passed through the heater for the working gas. In published German patent application (OS) No. 1,601,464 a hot gas piston engine of this general type was disclosed in which the bundle of tubes constituting the heater is arranged in a circle and in which an air preheater of annular shape is provided surrounding this circle. In this arrangement, the combustion chamber is located inside the heater circle and the hot gasses first strike the heater tubes, giving up a large part of their energy to them, and then stream directly to the air preheater surrounding the heater, making further use of the heat energy of the combustion products to heat the combustion-supporting air supply for the combustion chamber.

By preheating of the combustion air, very high hot gas temperatures are obtainable and also an economical use of fuel. In the known engine above described, however, there is the danger that even a slight change of conditions, for example, a slight change of the rate of fuel supply, may produce a relatively sharp change of the hot gas temperatures, because almost simultaneously with the change of the rate of fuel supply affecting one of the combustion components, there is a resulting drop in the temperature of the combustion air, affecting the other combustion component, so that the combustion temperature is doubly reduced. In other words, this feedback effect in the given example of a slight reduction of the later fuel supply, first leads to a proportional reduction of the hot gas temperatures. In consequence, the temperature of the preheated air is likewise reduced. The result is that the combustion then takes place both with less fuel and with colder combustion air.

It is an object of the present invention to overcome instability of operation of a hot gas piston engine by providing some decoupling of the combustion chamber and the preheater of its air supply.

Subject Matter of the Present Invention

Briefly, at least two separate combustion chambers are provided and the preheater for the air supply of one combustion chamber is arranged to obtain its heat from the combustion products of another combustion chamber. By this means there is advantageously produced a substantial and extensive automatic equalization of the power developed by the individual combustion chambers. The preheater temperature for the air delivered to one combustion chamber is now independent of the combustion conditions existing in this same combustion chamber. When there is a change of the combustion conditions in one combustion chamber, the effect now is that at the same time there is produced an equalization of the combustion conditions in the other combustion chambers. The power developed in the individual heater sections accordingly likewise experiences an equalization in an advantageous manner. This leads to uniform thermal and mechanical loading of all parts. As a result of the extensively automatic equalization thus taking place, there results a much desired positive influence of temperature regulation.

In the case of hot gas piston engines in which the heater tubes of each heater section stand in a row and thus form a straight wall, it is possible to dispose the combustion chamber on one side of such a wall of tubes and to locate on the other side thereof the hot gas input of an air preheater energized by the combustion products of the aforesaid combustion chamber, thus providing a substantially deflection-free hot gas flow. This arrangement makes unnecessary the provision of heat shields or metal baffles that have only a short useful life because of the very high temperatures of the heating gases.

In a further development of the invention, which is of considerable advantage, more than two combustion chambers are provided in a hot gas piston engine with the air preheater supplying a first combustion chamber heated by the combustion products of a second combustion chamber, for which the combustion air is preheated by the combustion products of still another combustion chamber. In this manner, a far-reaching equalization of the power provided at all of the heater sections can be provided.

By the adjacent position of the air input of a combustion chamber and the air output of its air preheater, very short ducts for the preheated combustion air can be used, to great advantage. In hot gas piston engines in which the heaters form a heater tube wall extending longitudinally over the full length of the engine, it is advantageous to dispose the combustion chambers for heating successive sections of the heater wall alternately on opposite sides of the heater wall. This provides a highly compact and space-saving construction.

In another form of the invention, where casing units containing the working parts of the engine are arranged in a circle or crown and flat heaters are disposed perpendicularly to the crown circumference, the air preheaters of the combustion chambers associated with the individual heaters are heated by the combustion products of the combustion chamber for the preceding heater in the circumferential direction, which is to say that the sequence is in the same direction around the circumference of the crown arrangement. This results in a very compact construction, in very short and substantially deflection-free paths for the preheated air and also in an advantageously automatic equalization of the heat transfer to all the heater sections.

Where it is desired to obtain a low engine height, the air preheaters are disposed on the longitudinal sides of the adjacent casing units, approximately parallel to their median longitudinal axes, and the hot gas input of the air preheaters is placed at about the same height as the related heater section. In the case of an arrangement of combustion chambers and air preheaters in alternating rows, this disposition of the preheaters provides a good utilization of space between successive combustion chambers.

In still another form of the invention, the air preheaters are disposed above the heaters and the combustion chambers, approximately perpendicularly to the axes of the adjacent casing units. With that arrangement, there can advantageously be provided ducts for the heating gases from the respective combustion chambers to the respective air preheaters disposed so as to close off the top of the hot portion of the engine.

By providing countercurrent flow of heating gas and combustion air in the region of the heat exchanger walls of the air preheaters, a very good degree of utilization of the residual heating gas energy is obtained.

The invention will be further described by way of examples with reference to the accompanying drawings, in which.

Figure 1:
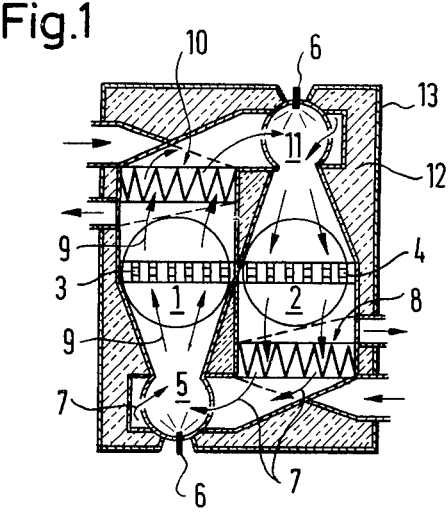
FIG. 1 is a diagram of the application of the invention to a single cylinder engine.

FIG. 1 is a basic diagram of a displacement engine with a single cycle constituted of the cylinder 1 and the casing 2. The cylinder 1 and the casing 2 together form a casing unit. In the cylinder 1 there is as a rule a hot work space and a cold work space. The hot work space in a displacement type engine is closed off by a recuperator piston and the cold work space is similarly closed off by a work piston. In the casing 2 are located, one above the other, a cooler and a regenerator. The cooler is connected over a cold conduit with the cold work space. A modification of such an engine is also conceivable in which the cold work space could be located in the casing 2.

Another gas flow path is provided between the hot work space and the regenerator, hence in the example of FIG. 1, likewise between the cylinder 1 and the casing 2. In this flow path a heater is provided for transfer of energy from the heating gases to the working gas. The heater section disposed in the neighborhood of the cylinder 1 is designated 3 and the heater section disposed in the neighborhood of the casing 2 is designated 4 in FIG. 1. Tubes bent into U-shape, preferably, are used to constitute the heater, each tube connecting the cylinder 1 and the casing 2, the bank of tubes in practice having one end connected to a manifold leading to the cylinder 1 and the other end connected to a manifold leading to the casing 2, these manifolds being located above the cylinder and casing and extending over the whole width of the heater. As indicated in the present example, the heater sections 3 and 4 each form a substantially flush plane wall. This is readily provided by arranging the tubular elements in parallel rows. A combustion chamber 5 is provided for direct impingement on the heater section 3. A liquid fuel, for example, can be sprayed into the combustion chamber 5 by the spray nozzle 6 which is shown only diagrammatically in FIG. 1.

The combustion air, the flow of which is indicated by the arrow, is preheated in a preheater 8 disposed next to the combustion chamber 5 for improvement of the combustion conditions. Fresh air is supplied to the preheater 8, for example, by means of a blower (not shown). The hot combustion products flowing out of the combustion chamber 5 are designated by the arrow 9. These gases are at a temperature of about 1800°C. They first strike the heater section 3, then flow away from it cooled to about 900°C. to another air preheater 10, in which the combustion air from the combustion chamber 11 heating the heater section 4 is preheated. Finally, the already twice used heating gases are released into the atmosphere, for example, through an exhaust pipe (not shown).

The entire fresh air supply can, for example, be provided through the same blower with which the air preheater 8 is supplied. The combustion products formed in the combustion chamber 11, after they leave the heater section 4, are again utilized in the air preheater 8 and then likewise released through an exhaust pipe. A spray nozzle 6 is likewise provided for spraying the fuel into the combustion chamber 11.

By the provision on one side of the respective heater sections 3 and 4 of the respective combustion chambers 5 and 11 and, on the opposite side, of the air preheaters 10 and 8 formed by the combustion products of the respective combustion chambers, substantially deflection-free flow paths are provided for the heating gases. As a result of the transposed arrangement of the combustion chambers 5 and 11 on opposite sides of the wall formed by the heater sections 3 and 4, close proximity of the combustion chambers and the preheaters for their air supply is obtained. The combustion chamber 5, as described, is supplied with air from the preheater 8, while the combustion chamber 11 is supplied with air from the preheater 10. Consequently, a mutual influencing and equalization of the heating gas temperatures may be obtained. If, for example, the combustion chamber 5, as a result of some disturbance, receives less fuel than before, the combustion products produced in the combustion chamber 5 will then be colder than previously. The temperature at which the heating gases reach the air preheater 10 accordingly falls likewise. In consequence, there is less preheating of the combustion air for the other combustion chamber 11 and hence also in this region a lower heating gas temperature. The energy transfer rate, that is, the power developed, in the region of the heater sections 3 and 4, thus experiences an equalization. In this fashion it is made possible, when a regulation system is provided for the engine, to unify the two burner loads very simply and cheaply. The frequency of regulation action is thereby desirably kept relatively small and the amplitude of regulatory action likewise remains small. As the result of the support hereby given for the action of a measured temperature regulation, it is possible to keep the range of temperature variation very small and thus to operate at a high process temperature in the region of the upper limit of the thermal load capacity of the engine materials, and for this reason to obtain a high efficiency. For the reduction of heat losses, the entire equipment is embedded in heat insulation 12, for example, insulation of short ceramic fibers or ceramic cloth mats. A sheet metal cover 13, for example, provides the outer covering for the engine.

Figure 2:
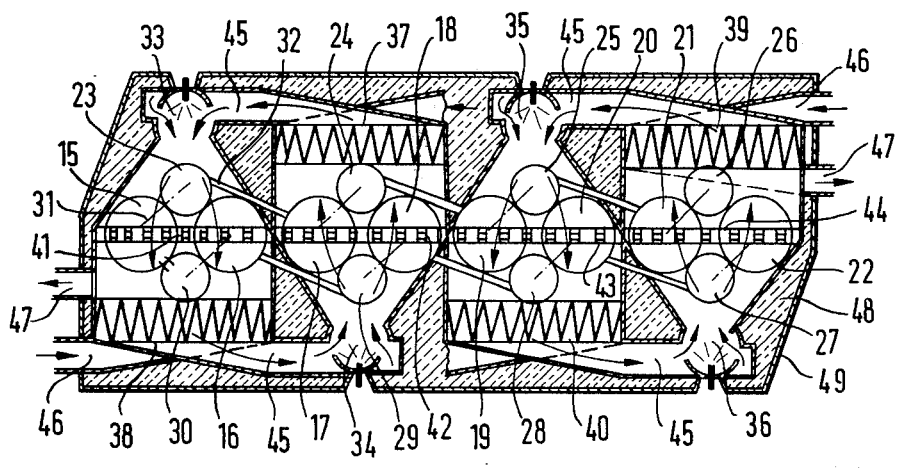
FIG. 2 is a diagram of a first embodiment of a multicylinder in-line engine.

The double-action hot gas piston engine shown in FIG. 2 comprises eight cylinders 15 to 22 in line in a single row, each of them having a hot work space and a cold work space separated by a piston. The associated regenerators and coolers are located in casings 23 to 30. A hot conduit 31 as shown in this example by a dot-dash line, leads from each hot work space to the associated regenerator-cooler casing. A cold conduit 32, shown in the present example by a double line, leads from the casing just mentioned to the cold work space of a different cylinder. Each cylinder-casing pair is connected together by a hot conduit 31 forms one casing unit. The region of the hot conduits 31 are provided heaters, for example, formed with tubes bent in U-shape, for picking up energy from combustion. For generating the energy, four combustion chambers 33 to 36 are provided, each with a preheater 37 to 40 for its air supply.

Each heater section, acted on by one combustion chamber, accordingly comprises two cylinders with the regenerator-casings associated therewith in their respective casing units. The heater section designated 41 belongs to the cylinders 15 and 16 and to the regenerator-cooler casings 23 and 30. The combustion chambers for heating neighboring heating sections are in this example in transposed arrangement on different sides of the cylinder row. There is an alternating succession of combustion chambers and air preheaters on each side of the cylinder row. A highly compact and space-saving construction consequently results. By the opposed positioning in each case of a combustion chamber and of the air preheater traversed by the combustion products of this combustion chamber, there again results the highly desirable deflection-free flow path for the very hot heating gases. According to the invention, the air preheated in the preheater 38 that is heated by the flow of the combustion products of the chamber 33 is supplied to the combustion chamber 34, the combustion products of which flow through the air preheater 37 in which the air for the first combustion chamber 33 is preheated. This provides an equalization of the power to be developed in the heater sections 41 and 42. The same holds for the heater sections 43 and 44. In that case, the combustion products of the chamber 35 flow through the preheater 40 in which the combustion air for the other combustion chamber 36 is preheated and the combustion products from the chamber 36 flow through the preheater 39 that supplies air to the combustion chamber 35. Hence in each case, the air input of a combustion chamber and the air output of the preheater supplying the air to it are located close to each other; very short and equal paths are provided for the preheated air. The cooling of the preheated air on its way between the preheater and the combustion chamber is accordingly very slight. The connecting ducts, which are designated 45, are accordingly conveniently made all of the same size. The fresh air supply duct 46 can, for example, be provided with fresh air either in common or separately by a blower not shown in the drawing. After their utilization in the air preheaters, the heating gases are released through an exhaust pipe 47. The modular construction of the whole assembly of modules each containing two cylinders, their associated regenerator-cooler casings, corresponding heater section, a combustion chamber and its oppositely disposed air preheater makes possible a simple management both of assembly components and of replacement components. For effective mitigation of heat losses, the whole equipment is provided with a refractory layer of insulation 48, for example, made of short ceramic fibers, and an outer enclosing sheet metal cover 49.

Figure 3:
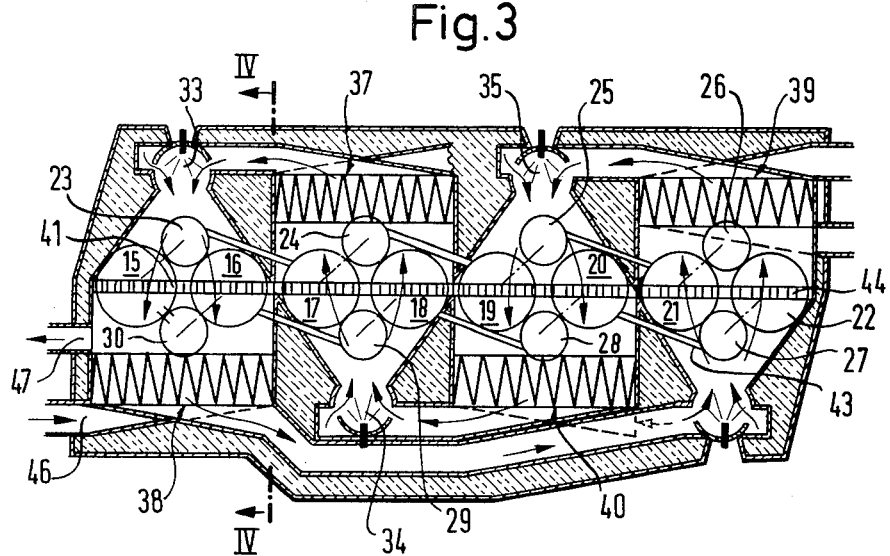
FIG. 3 is a diagram of another embodiment of the invention in a multicylinder in-line engine.

The eight cylinder in-line motor shown in FIG. 3 corresponds in basic design to the arrangement of the embodiment shown in FIG. 2. For this reason, similarly disposed parts are designated with the same reference numerals. In the embodiment here shown, as the result of the special rearrangement of the connection lines 45, a thorough equalization of the power to be transferred to the various heater sections is accomplished. The air preheater 38 heated by the combustion chamber 33 arranged at one end of the cylinder row is in this case arranged to supply air to the combustion chamber 36 at the other end of the cylinder row, from which the combustion products flow to the air preheater 39, which heats the air supplied to the combustion chamber 35, which has one of the inner positions in the cylinder row. The combustion products from the chamber 35 flow through the preheater 40 that supplies air to the combustion chamber 34, which is likewise in an inner position in the row. The combustion chamber 34 supplies hot exhaust gases to the preheater 37 that supplies air to the first combustion chamber 30. In the row arrangement shown in FIG. 3, the conduit that brings the preheated air from the preheater 38 to the combustion chamber 36 is somewhat longer than the other connection ducts. By using a particularly thick layer of insulation, however, even the heat losses in this long connection can be held very small. In view of the advantage that the power transfer to the individual heater sections 41 to 44 are subject to a very strong equalization as the result of the chain reaction of one combustion operation on another, this slight extra expense for insulation is clearly acceptable.

Figure 4:
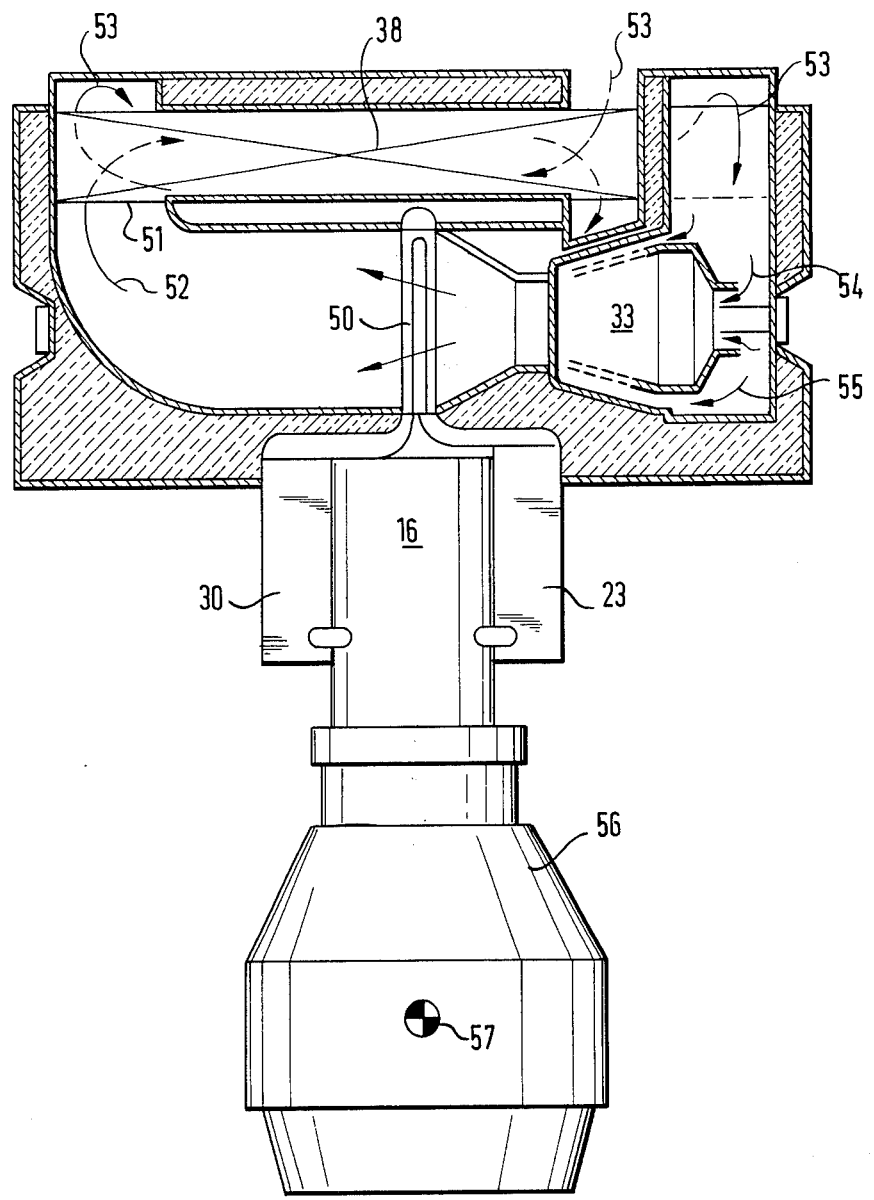
FIG. 4 is a cross-section along the lines IV—IV of FIG. 3.

As shown in FIG. 4, the air preheaters 37 to 40 can be located above the tubular elements 50 bent double in U-shape and forming the heater wall. In the embodiment here represented, only two rows of tubes are shown. A construction is readily imaginable, however, in which three or more rows of tubes are provided through which the hot gases successively pass. Air preheater 38 in this arrangement provides a fully enclosed channel for the passage of the heating gases from the combustion chamber 33. The hot gas input 51 of the preheater 38 is disposed on the side of the heater wall opposite that on which the combustion chamber 33 is disposed. The heating gases pass through the preheater 38 (and similarly through the other preheaters) in the manner shown by the arrows 52, while the air to be preheated flows countercurrent therethrough as shown by the arrows 53. By dividing the preheated air supplied to the combustion chamber 33 into a primary air stream designated by the arrow 54 and a secondary air stream designated by the arrow 55, the combustion conditions in the combustion chamber can readily be provided with very good regulation as well as with readily adjustable flame shape. It is also possible to arrange the air preheaters 37 to 40 in a standing arrangement with one side of the adjacent casing units approximately parallel to the corresponding heater sections. As is further shown in FIG. 4, crank case 56 in which a crankshaft 57 is mounted is located in the present case below the row of cylinders 15 to 22, of which the cylinder 16 is shown in FIG. 4. The displaceably mounted pistons in the cylinders 15 to 22 are connected to the crank sections of the crankshaft in a suitable driving linkage. As the result of the particularly thorough equalization of the power to be transferred in the individual heater sections, a quiet, equalized and knock-free operation of the crankshaft advantageously results.

Figure 5:
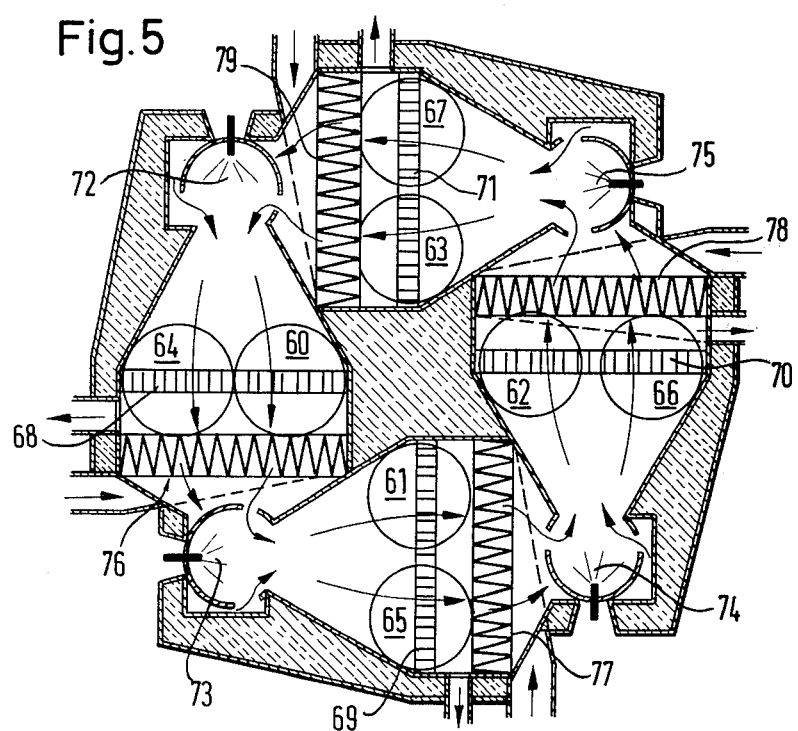
FIG. 5 is a diagram of an embodiment of the invention in an engine in which cylinders are disposed in a crown arrangement.

FIG. 5 shows a crown arrangement comprising four cylinders 60 to 63 and four adjacent associated regenerator-cooler casings 64 to 67. To each casing unit, such as that made up of the cylinder 60 and the adjacent regenerator-cooler 64, there belongs a heater section 68 to 71, such as 68 in the cited instance. Each heater section 68 to 71 forms a plane wall arranged substantially perpendicular to the crown circumference. On one side of each heater section is one of the combustion chambers 72 to 75 and on the opposite side of it, is one of the air preheaters 76 to 79 that is heated by combustion products from the aforesaid combustion chamber which pass through the aforesaid heater section. Thus, for example, the heater section 68 is located between the combustion chamber 72 and the air preheater 76 or, more precisely, the hot gas input of the preheater 76. The heater section 69 is located between the combustion chamber 73 and the air preheater 77. The combustion products from the combustion chamber 72 pass through the air preheater 76, in which the combustion air is heated for the next combustion chamber around the circle, that is, the combustion chamber 72 which is next behind the combustion chamber 73. In the air preheater 77, combustion air is heated for the combustion chamber 74 which is next around the circle behind the combustion chamber 73. Finally, the combustion products from the combustion chamber 75 heat the preheater 79 which supplies air to the first combustion chamber 72, thus completing the circle. In this arrangement also a mutual influencing of all combustion chambers and thereby thorough equalization of the power to be delivered to the individual heaters takes place. It is convenient in the example shown in FIG. 5 to place the air preheaters 76 to 79 above the heater sections 68 to 71, in the same manner as described in connection with other embodiments.

As the above-described embodiments show, the invention is in no way limited to the particular examples. Thus, for example, it is possible to increase or decrease the number of cylinders for any of the examples given by omitting or adding additional modules or, for another example, to locate the regenerators and the coolers in the annular spaces surrounding the associated cylinders.

I claim:

1. In a hot gas piston engine with at least one casing unit comprising a hot working chamber and a cold working chamber, in which each hot working chamber is connected through a heater, a regenerator and a cooler with a cold working chamber, and in which at least a section of each heater is provided with a combustion chamber, for generating energy, which then is provided with a preheater for its combustion-supporting air;

the improvement comprising:
a plurality of combustion chambers (5, 11; 33 to 36; 72 to 75);
an air preheater located ahead of each combustion chamber in the air supply thereof (8, 9; 37 to 40; 76 to 79), each said air preheater being supplied with heat from the combustion products of a combustion chamber other than the combustion chamber to which said preheater delivers preheated air (5, 11; 33 to 36; 72 to 75).

2. Improvement in a hot gas piston engine as defined in claim 1 in which each heater section is constituted in the form of a flat wall, on one side of which is disposed a combustion chamber and on the other side of which is disposed the hot gas input of an air preheater through which the combustion products of the aforesaid heating chamber flow after passing through interstices in said flat wall.

3. Improvement in a hot gas piston engine as defined in claim 1 in which at least three combustion chambers are provided and in which the air preheater for a first combustion chamber is heated by the combustion products of a second combustion chamber of which the air supply is preheated by the combustion products of a third combustion chamber.

4. Improvement in a hot gas piston engine as defined in claim 1 in which the air input of each combustion chamber is adjacent to the air output of the preheater for its air supply.

5. Improvement in a hot gas piston engine as defined in claim 1 in which the heater sections are constituted so that together they form a single heater wall extending longitudinally of the engine over substantially its full length and in which the combustion chambers (33 to 36) disposed to transfer heat respectively to adjacent heater sections (41 to 44) are disposed alternately on opposite sides of said wall formed by said heater sections.

6. Improvement in a hot gas piston engine as defined in claim 1 in which a multiplicity of said casing units (60 to 67) are disposed in a crown arrangement and in which plane heater sections (68 to 71) are disposed substantially perpendicularly to the crown circumference, and in which, further, the air preheaters (76 to 79) supplying air respectively to combustion chambers (72 to 75) for the individual heater sections (68 to 71) are supplied with heat by the combustion products of the respective combustion chambers located in front of them with reference to the circumferential direction chosen for the direction of combustion product flow in the crown arrangement.

7. Improvement in a hot gas piston engine as defined in claim 1 in which each heater section (41 to 44) heated by a single combustion chamber (33 to 36) provided with an air preheater (37 to 40) comprises the heaters for a plurality of said casing units (15 to 30).

8. Improvement in a hot gas piston engine as defined in claim 1 in which the air preheaters (37 to 40) are disposed on the longitudinal side of adjacent casing units (15 to 30) approximately parallel to their median longitudinal axes and at their respective heating gas inputs (51) are located at approximately the same height as the respectively corresponding heater sections (41 to 44).

9. Improvement in a hot gas piston engine as defined in claim 1 in which the air preheaters (37 to 40) are disposed approximately perpendicular to the axes of the respective adjacent casing units (15 to 30) and above the combustion chambers (33 to 36) and the heater sections (41 to 44), said heater sections being constituted of tubes (50) bent into U-shape.

10. Improvement in a hot gas piston engine as defined in claim 1 in which in the region of the heat exchange walls of the air preheaters (8, 10; 37 to 40; 76 to 79) the combustion products furnishing the heat and the air being preheated are arranged for countercurrent flow.

11. Improvement in a hot gas piston engine as defined in claim 1 in which the preheated air is divided in the region of the combustion chambers (33 to 36) into a primary air current (54) and a secondary air current (55).

* * * * *